United States Patent
Nowik et al.

(10) Patent No.: US 9,266,277 B2
(45) Date of Patent: Feb. 23, 2016

(54) NEGATIVE THERMOFORMING PROCESS FOR VEHICLE INTERIOR COVERINGS

(71) Applicant: Faurecia Interior Systems, Inc., Auburn Hills, MI (US)

(72) Inventors: Steve J. Nowik, Ray, MI (US); Edgar Nimmergut, White Lake, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 326 days.

(21) Appl. No.: 13/843,894

(22) Filed: Mar. 15, 2013

(65) Prior Publication Data

US 2013/0221698 A1    Aug. 29, 2013

Related U.S. Application Data

(63) Continuation-in-part of application No. 12/763,548, filed on Apr. 20, 2010, now Pat. No. 8,501,063.

(51) Int. Cl.

| | |
|---|---|
| B29C 51/10 | (2006.01) |
| B62D 29/04 | (2006.01) |
| B29C 69/00 | (2006.01) |
| B29C 59/04 | (2006.01) |
| B29C 51/14 | (2006.01) |
| B29L 9/00 | (2006.01) |
| B29L 31/30 | (2006.01) |
| B29C 51/42 | (2006.01) |
| B29L 31/00 | (2006.01) |

(52) U.S. Cl.
CPC ............... *B29C 51/10* (2013.01); *B29C 59/046* (2013.01); *B29C 69/00* (2013.01); *B62D 29/04* (2013.01); *B29C 51/14* (2013.01); *B29C 51/421* (2013.01); *B29C 2791/006* (2013.01); *B29C 2791/007* (2013.01); *B29K 2995/0022* (2013.01); *B29L 2009/005* (2013.01); *B29L 2031/3005* (2013.01); *B29L 2031/722* (2013.01)

(58) Field of Classification Search
CPC .................................. B29C 51/10; B29C 51/14
See application file for complete search history.

(56) References Cited

U.S. PATENT DOCUMENTS

| | | | |
|---|---|---|---|
| 3,399,101 | A | 8/1968 | Magid |
| 4,714,424 | A | 12/1987 | Kinugasa et al. |
| 4,781,569 | A | 11/1988 | Kinugasa et al. |
| 6,841,105 | B2 | 1/2005 | Nehring et al. |
| 7,157,041 | B2 | 1/2007 | Fitzell, Jr. |
| 8,501,063 | B2 | 8/2013 | Nowik et al. |
| 2003/0067100 | A1 | 4/2003 | Kato et al. |
| 2005/0186396 | A1 | 8/2005 | Okajima et al. |
| 2005/0212181 | A1 | 9/2005 | Evans et al. |
| 2007/0135569 | A1 | 6/2007 | DeRudder |
| 2010/0104828 | A1 | 4/2010 | Engel et al. |
| 2011/0032720 | A1 | 2/2011 | Chen et al. |
| 2011/0254206 | A1 | 10/2011 | Nowik et al. |

OTHER PUBLICATIONS

FRIMO Plastics Technologies in Motion, IMG-Technology, 6 pages.

*Primary Examiner* — James Sanders

(74) *Attorney, Agent, or Firm* — Reising Ethington P.C.

(57) ABSTRACT

A method of forming a thermoplastic sheet for use with a vehicle interior panel includes a negative thermoforming process. The negative thermoforming process can provide a grained and/or coated show surface of the thermoplastic sheet with decorative features that are more sharply defined that those produced using a positive thermoforming process.

9 Claims, 4 Drawing Sheets

NEGATIVE THERMOFORMING PROCESS FOR VEHICLE INTERIOR COVERINGS

This application is a continuation-in-part of prior U.S. application Ser. No. 12/763,548, filed Apr. 20, 2010.

TECHNICAL FIELD

The present disclosure relates generally to forming thermoplastic sheets for vehicle interior panels.

BACKGROUND

Vehicle interior panels, such as door panels, dashboard panels, instrument panels, and headliner panels, are often formed from of a thermoplastic sheet. A grain or other texture is sometimes formed in the show surface (i.e., the exposed surface of the eventual panel that can be observed by a vehicle occupant) to provide enhanced aesthetics, such as to simulate leather. A coating may be applied to the show surface of the thermoplastic sheet and to raised portions of individual granules of the grained surface in a so-called tipping process to enhance the appearance of the surface, and in some cases to furnish surface qualities like softness and matte. The coating can be a gloss, paint, or other material. In some applications, the thermoplastic sheet is formed to its product shape by a positive thermoforming process, in which the thermoplastic sheet is heated and the side of the sheet opposite the show surface is brought into contact with a thermoforming tool surface to form the thermoplastic sheet to the desired shape. Such positive thermoforming processes can limit the sharpness or definition of features formed in the show surface.

SUMMARY

In accordance with one embodiment, a method of forming a thermoplastic sheet for use with a vehicle interior panel includes the steps of: providing a thermoplastic sheet having a decorative grain formed in a show surface of the thermoplastic sheet; and forming the thermoplastic sheet in a negative thermoforming process by bringing said show surface into direct contact with a surface of a thermoforming tool. The thermoforming tool surface includes a recess or protruding structure that forms a decorative feature other than the decorative grain in the show surface of the thermoplastic sheet.

In accordance with another embodiment, a method of forming a thermoplastic sheet for use with a vehicle interior panel includes the steps of: providing a thermoplastic sheet having a partially coated decorative grain formed in a show surface of the thermoplastic sheet; and forming the thermoplastic sheet in a negative thermoforming process by bringing said show surface into direct contact with a surface of a thermoforming tool. The thermoforming tool surface includes a recess or protruding structure that bends the show surface by more than 90 degrees.

In accordance with another embodiment, a covering for use with a vehicle interior panel includes a formed thermoplastic sheet having a show surface and a decorative grain formed in the show surface. The covering also includes a decorative feature other than the decorative grain formed in the show surface. The show surface includes a bend that is greater than 90 degrees, a radius that is between 0.8 mm and 2.0 mm, or both, located along the decorative feature.

BRIEF DESCRIPTION OF THE DRAWINGS

One or more embodiments of the will hereinafter be described in conjunction with the appended drawings, wherein like designations denote like elements, and wherein.

DETAILED DESCRIPTION OF THE PREFERRED EMBODIMENT(S)

Figure 1:
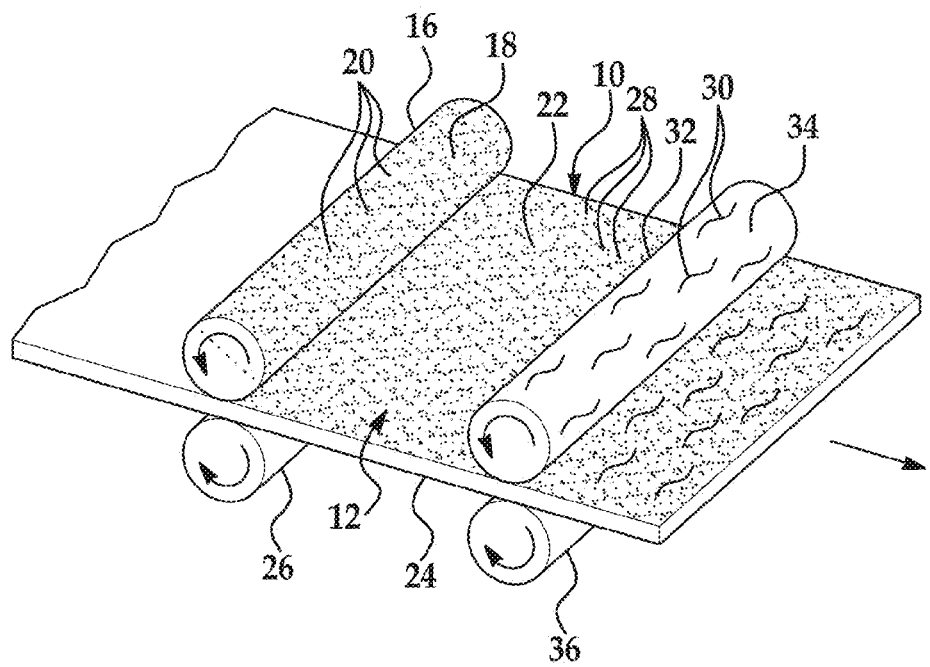
FIG. 1 is a diagrammatic view of an exemplary embodiment of a sequential rolling process used to grain and coat an outer surface of a thermoplastic sheet.

Referring to the drawings, the figures together show an exemplary embodiment of a graining and coating process which can produce a resulting show surface on a thermoplastic sheet 10 with finely detailed grains located on sharp radii features such as faux seam lines, edges, logos, and lettering, and with minimal or no grain wash-out. The resulting show surface is grained and coated to have an enhanced appearance that mimics leather, wood, and other material and patterns, that furnishes surface qualities like softness, depth, matte, age, distress, and the like, or a combination thereof.

Thermoplastic sheets, or skins, subject to the exemplary process are often composed of a thermoplastic polyolefin (TPO) material, an acrylonitrile-butadiene-styrene (ABS) material, a polypropylene material, a polyethylene material, a thermoplastic urethane (TPU) material, or another suitable material. The thermoplastic sheets can be used to manufacture vehicle interior panels such as door panels, dashboard panels, and headliner panels for cars, trucks, boats, and the like. The thermoplastic sheets can be backed by a foam or another material. And depending on the application, the thermoplastic sheets can be contoured in various shapes to a preformed product, can have voids for windows controls and other human-machine-interfaces and electronics, and can include a separate and distinct insert or another structure.

The exemplary process illustrated in FIGS. 1-4 includes the general steps of providing a first grain 12, coating the first grain, and then providing a second grain. FIG. 1 shows a process of pre-graining and coating. The first grain 12 is imparted or transferred to a portion or more of the otherwise ungrained and uncoated thermoplastic sheet 10 by way of a first roller 16 (also called a calendar roll). The first roller 16 has a first graining surface 18 with multiple individual granules 20 which are forcibly rolled directly against a show surface 22 of the thermoplastic sheet 10. The show, or outer, surface 22 is that which will be observed by a vehicle occupant when the thermoplastic sheet 10 is in final panel form, while an opposite or back surface 24 is not exposed to the vehicle occupant and therefore is not grained or coated. The first roller 16 can be a driving (active) or driven (passive) roller. Another roller 26 can be provided without a graining surface and instead can be used to guide or drive the thermoplastic sheet 10. The first grain 12 has individual granules 28 shaped and sized to receive coating during the coating process. The individual granules 28 create raised and depressed (unraised) portions in the show surface 22. Of course other rollers or other means of imparting the first grain 12 can be used instead of, or in addition to, the illustrated first roller 16.

Still referring to FIG. 1, raised portions of the individual granules 28 are then coated, or tipped, with a coating material 30 by way of a second roller 32 (also called an ink roller). The second roller 32 has a coating surface 34 which carries the coating material 30 and directly contacts and applies the coating material to the raised portions of the show surface 22, while the depressed portions remain uncoated. The second roller 32 can be a driving (active) or driven (passive) roller. Another roller 36 can be provided without a coating surface and instead can be used to guide or drive the thermoplastic sheet 10. In a mass production manufacturing environment, the first and second rollers 16, 32 can be part of, and can constitute, a sequential rolling process where the respective processes are performed in immediate order. Or the respective rolling processes can be separate and distinct processes performed at different times and at different locations. Of course other rollers and other components can be used instead of, or in addition to, the components shown and described in order to coat the show surface 22. For example, in another embodiment of the coating process, the coating material can be applied in another way and without the rollers 32, 36 such as by way of a spraying process. Also, either just a portion or the entire sheet can be coated. For example, rather than coating only the raised portions, one or more regions of the surface can be completely or partially coated while other areas are not.

Figure 2:
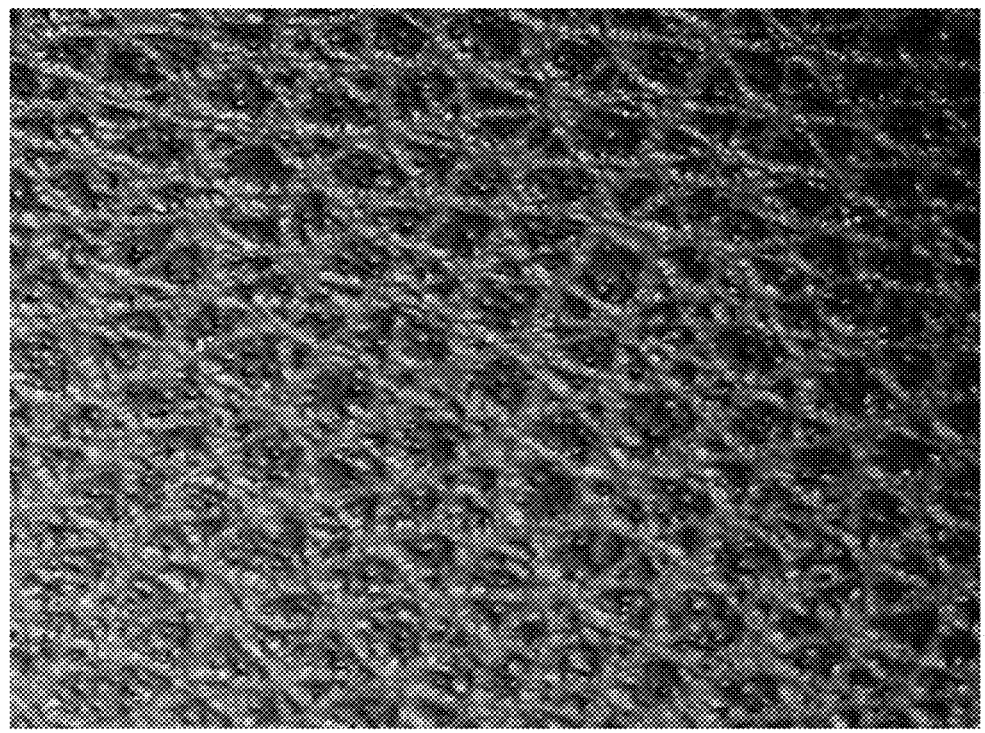
FIG. 2 is a magnified and enlarged view of a pre-grained and coated outer surface of the thermoplastic sheet of FIG. 1.

The coating material 30 can be a material which enhances or diminishes the gloss properties of the raised portions of the show surface 22, which provides a different color to the raised portions as compared to the depressed portions, or which influences appearance properties of the raised portions in another way. For example, the coating material 30 can create a dual gloss, dual color, hue effect, or a combination thereof on the show surface 22. FIG. 2 shows the resulting grained and coated individual granules 28 created by the known process of FIG. 1. The nonuniform raised portions are shown darker than the depressed portions; of course, different patterns and constructions of grained and coated individual granules can be created by the process of FIG. 1.

Figure 3:
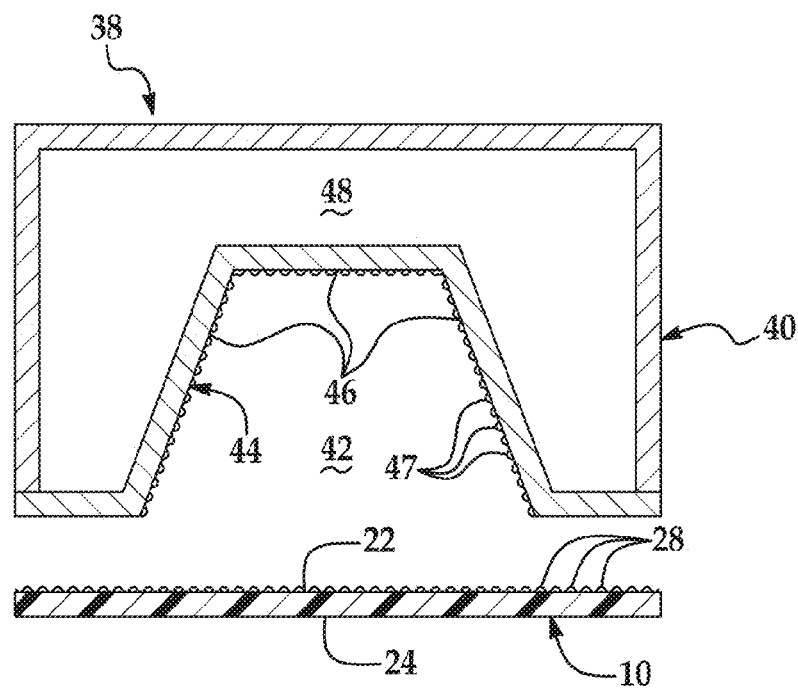
FIG. 3 is a diagrammatic view of an exemplary embodiment of a thermoforming process which puts grains on the outer surface of the grained and coated thermoplastic sheet of FIG. 1.

After the coating material 30 is dry or at least substantially dry, a second grain may be imparted or transferred to the show surface 22 by a negative thermoforming or in-mold graining process. Referring to FIG. 3, a vacuum thermoforming machine 38 includes a mold 40 with a thermoforming tool 44 which can be a separate and removable component or can be a one-piece structure. The illustrated tool 44 is shaped with a female cavity 42 and has a surface 46 directly confronting the intended show surface 22 of the thermoplastic sheet 10. In this case, the tool surface 46 is a graining surface and includes multiple individual granules 47 which are forcibly pressed directly against the show surface 22 during the forming process. The surface 46 has multiple minute vacuum passages (not shown) extending therethrough and communicating with a vacuum chamber 48 of the vacuum thermoforming machine 38. The surface 46 can have one or more protruding structures (not shown in FIG. 3) which form a corresponding recess in the thermoplastic sheet 10. Likewise, the tool surface 46 can have one or more recessed structures (not shown in FIG. 3) which form a corresponding protruding structure in the thermoplastic sheet. The vacuum thermoforming machine 38 can have different components, constructions, and arrangements than that shown by the diagrammatic exemplary representation of FIG. 3.

The second grain can have individual granules that have different constructions and patterns than the individual granules 28 of the first grain 12. For example, the individual granules of the second grain can be dimensioned with finer details and can be located along sharper radii features and edges (e.g., concave and convex features) of the thermoplastic sheet 10 as compared to the individual granules 28. The individual granules of the second grain can be located on and used to produce faux seam lines, edges, logos, lettering, and the like. On average, individual granules of the second grain can have finer details such as micro-textures and micro-stippling than is obtained by positive thermoforming processes that may involve stretching of the first grain during the thermoforming using a positive tool at the opposite side (i.e., the non-show surface) of the thermoplastic sheet. In general, a majority of the individual granules of the second grain can have finer details than a majority of the individual granules 28 of the first grain 12. In other embodiments, individual granules of the second grain need not have the finer details and need not be located along sharper radii features and edges of the thermoplastic sheet 10, and instead can resemble the individual granules 28.

In the exemplary process illustrated in FIG. 3, individual granules of the second grain can have different constructions and patterns than those produced by a positive thermoforming process with an ungrained positive tool. For example, the individual granules of the second grain can be dimensioned and configured with finer details and can be located along sharper radii features and edges as compared to individual granules produced by the ungrained positive tool process. In one example where the show surface 22 is bent at an angle of 90° or greater, a resulting radius of an edge with individual granules of the second grain found at the bend is approximately greater than or equal to 0.8 mm and less than 2.0 mm. Edges produced by the prior art ungrained positive tool process (i.e. a positive thermoforming process), in contrast, typically have a resulting radius at a bend of 90° or greater of approximately greater than 2.0 mm. In some cases, the bend does not even have visible individual granules because the granules have been elongated.

Still referring to FIG. 3, in an exemplary vacuum thermoforming process, after imparting the first grain 12 and applying the coating material 30, the thermoplastic sheet 10 is fixtured and placed between the mold 40 and an opposing mold (not shown) of the vacuum thermoforming machine 38. In this position, the show surface 22 directly faces and directly confronts the graining surface 46 and the individual granules 47. The opposing molds are then brought together and closed upon the thermoplastic sheet 10. The associated partial vacuum is initiated and the thermoplastic sheet 10 is suctioned and drawn into direct contact with the tool 44. The show surface 22 is forced against the graining surface 46, and the individual granules 47 impart the second grain directly over and on top of the first grain 12, and directly over and on top of the coating material 30. The thermoplastic sheet 10 can then be cooled or allowed to harden to produce the preformed product. The preform can then be removed, trimmed, backed with foam, or subsequently processed in another way.

Figure 4:
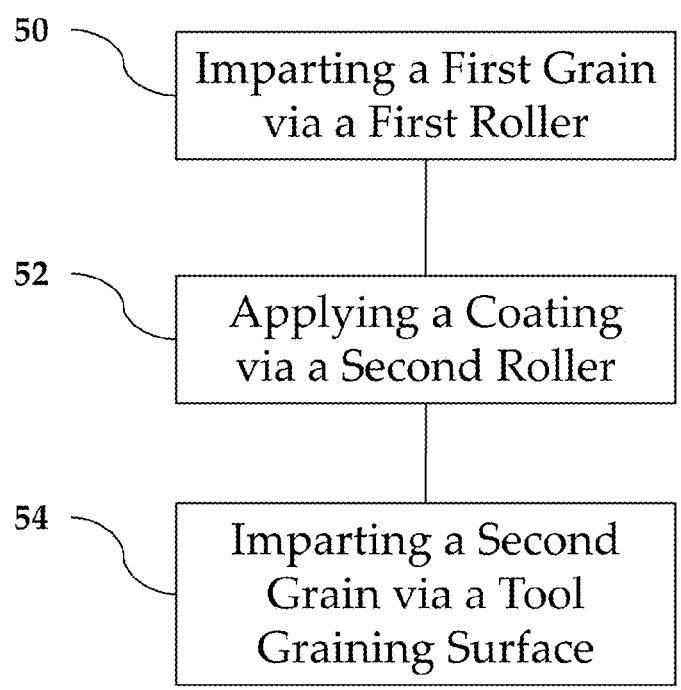
FIG. 4 is a flowchart outlining an exemplary method of a graining and coating process.

FIG. 4 is a flowchart outlining some of the general steps of the exemplary graining and coating process described above. At a step 50, the first grain 12 is imparted to the thermoplastic sheet 10 by way of the first roller 16. Then, at a step 52, the coating material 30 is applied by way of the second roller 32. And finally, at a step 54, the second grain is imparted by way of the graining surface 46.

In different embodiments, the exemplary process need not be performed in the order described, may differ in one or more particular steps, may have additional steps than those shown and described, and may not necessarily include every step that is shown and described. For example, the first grain could be imparted to the thermoplastic sheet by way of a plate that is forced against an outer surface of the thermoplastic sheet; the thermoforming process could be a pressure thermoforming process instead of a vacuum thermoforming process; there could be a cutting process before or after the first grains are imparted, after the coating is applied, or at another time; there could be heating and cooling processes performed to the thermoplastic sheet at different times in the process; the thermoforming machine could be equipped with plug assist capabilities; and the thermoplastic sheet could be supplied as stock with the first grain and the coating material already provided to the thermoplastic sheet (pre-grained and pre-coated)—in other words, the process steps of imparting the first grain and applying the coating material can be performed at different times and by different entities.

Figure 5:
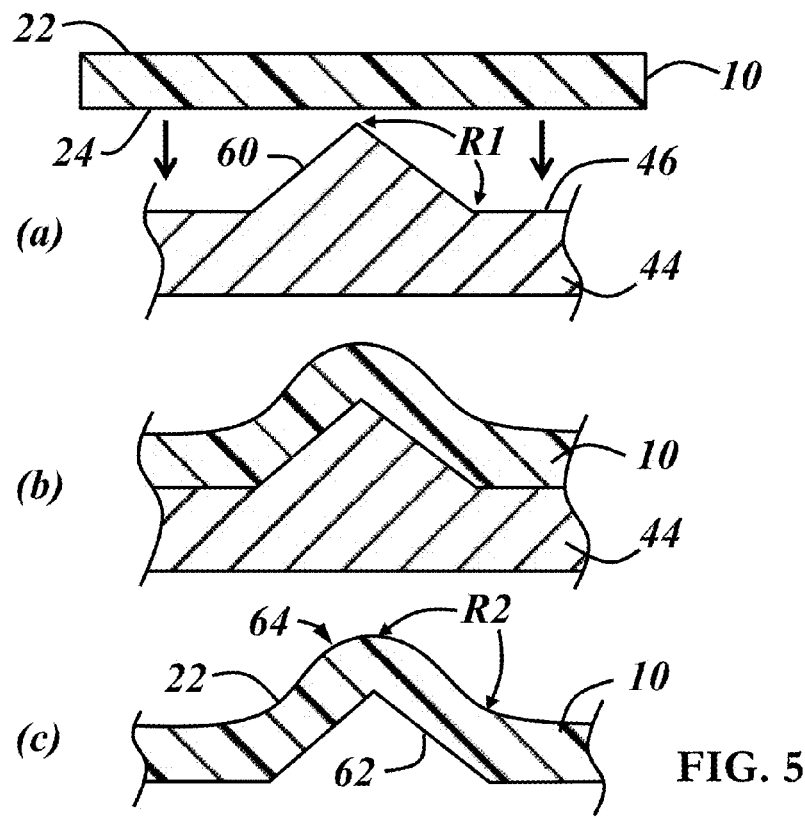
FIG. 5 is a cross-sectional view of a positive thermoforming process, where the tool surface includes a structure that forms a feature in the thermoplastic sheet.
Figure 6:
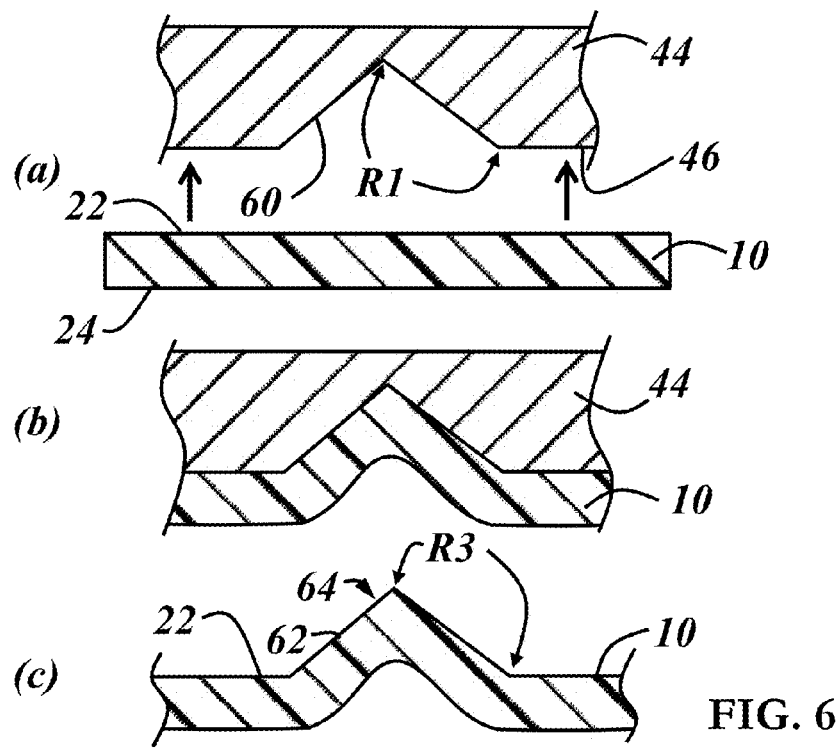
FIG. 6 is a cross-sectional view of a negative thermoforming process, where the tool surface includes a structure that forms a feature in the thermoplastic sheet.

In another embodiment, the negative thermoforming process can be performed on a pre-grained and/or pre-coated thermoplastic sheet using a thermoforming tool with an ungrained surface. FIGS. 5 and 6 demonstrate how the negative thermoforming process can be used to form sharper features in the show surface 22 of the thermoplastic sheet 10 than a positive thermoforming process, regardless of whether the tool surface 46 is a graining surface. FIG. 5 shows a positive thermoforming process with the thermoplastic sheet arranged over the tool surface 46 of the vacuum thermoforming tool 44 so that the back surface 24 of the sheet is facing the tool surface in view (a). The sheet 10 is heated and a vacuum is applied at the tool surface 46 so that the back surface 24 of the thermoplastic sheet 10 is drawn against and into contact with the tool surface to form the sheet in view (b). The formed sheet 10 is then cooled and removed from the tool surface as shown in view (c). In this example, the tool surface 46 includes a protruding structure 60 that forms a corresponding recess 62 in the back surface 24 of the sheet 10 and results in a decorative feature 64 (e.g., a faux seam line, edge, logo or lettering) being formed at the show surface 22 of the formed sheet. The radii R1 associated with the protruding structure 60 are small or sharp, any may be near-zero radii in some cases. The radii R2 associated with the feature 64 are not as small or sharp as R1 in the illustrated positive thermoforming process (R2>R1). This can be problematic where it is desired to form sharply defined features such as lettering in the show surface 22. As the thickness of the thermoplastic sheet 10 increases, the definition of the formed feature 64 may become even less defined. Thus with pre-laminated multi-layer thermoplastic sheets, which may include a 2-5 mm foam backing material that at the back side of the sheet, features formed at the show surface 22 can become washed-out or poorly defined, including any pre-graining that may stretch during the positive thermoforming process.

FIG. 6 shows a negative thermoforming process with the thermoplastic sheet 10 arranged beneath the tool surface 46 of the vacuum thermoforming tool 44 so that the intended show surface 22 of the sheet is facing the tool surface in view (a). The sheet 10 is heated and a vacuum is applied at the tool surface 46 so that the show surface 22 of the thermoplastic sheet is drawn against and into contact with the tool surface to form the sheet in view (b). The formed sheet 10 is then cooled and removed from the tool surface 46 as shown in view (c). In this example, the tool surface 46 includes a recessed structure 60 that forms a protrusion 62 in the show surface 22 of the sheet 10, resulting in feature 64 (e.g., a faux seam line, edge, logo or lettering) being formed at the show surface 22 of the formed sheet. The radii R1 associated with the recessed structure 60 of FIG. 6 are small or sharp as in FIG. 5, and may be near-zero radii. The radii R3 associated with the feature 64 are about the same as R1 in the illustrated negative thermoforming process (R3≈R1). Thus, even with thicker thermoplastic sheets 10, the shape of the formed feature 64 is very well-defined, often including any pre-graining at the show surface 22. In the illustrated positive thermoforming process, R2 may be 2.0 mm or higher, while in the illustrated negative thermoforming process, R3 may be between 0.8 mm and 2.0 mm or may even be less than 0.8 mm.

Figure 7:
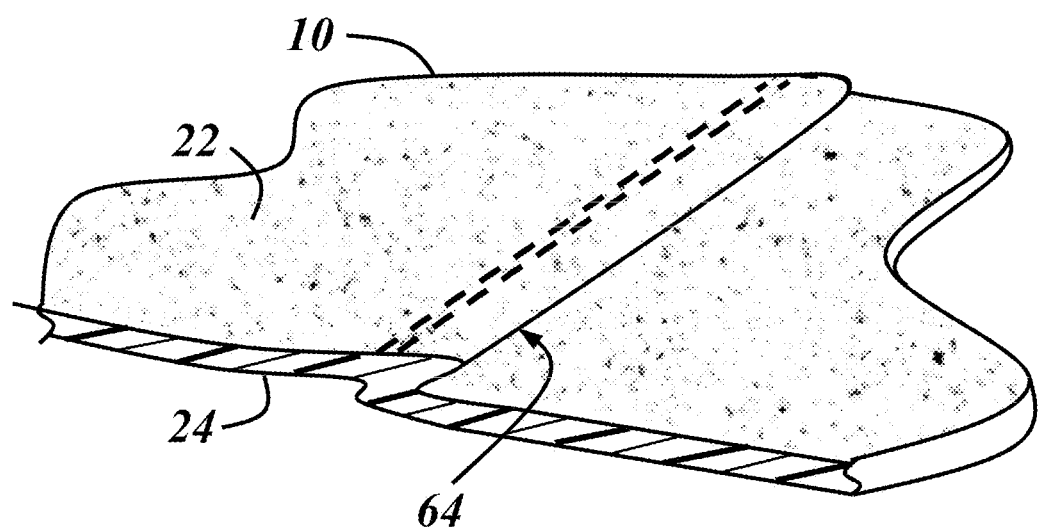
FIG. 7 is a partial perspective view of a formed thermoplastic sheet with a grained surface, where the show surface includes a bend that is greater than 90 degrees as part of a formed feature.

The tool surface 46 can be a grained surface as shown in FIG. 3, but it is not necessary. In one embodiment, a pre-grained and pre-coated or tipped thermoplastic sheet undergoes a negative thermoforming process to form the show surface to the desired contour for use as part of a vehicle interior panel such as an instrument panel. It has also been found that the show surface 22 of the thermoplastic sheet can be bent by more than 90° in the negative thermoforming process. An example of such a bend is shown in FIG. 7 along feature 64, which is a faux seam line in this example. Positive thermoforming processes are not necessarily capable to bending the show surface by more than 90°. Where bends of 90° or greater are formed in the show surface of the sheet 10, additional advantages to pre-graining and pre-coating the show surface 22 may be realized. For example, when it is desired to form a feature such as feature 64 in the show surface of the sheet 10 that includes a bend of greater than 90°, coating or tipping the grained show surface (whether the grain is applied to the show surface prior to thermoforming or during thermoforming) at the bend may not be possible because of limited access to the undercut portion of the feature. Pre-graining and pre-coating or tipping the pre-grained surface thus provides at least this additional advantage over such processes as in-mold graining In one embodiment, a pre-grained and pre-coated or tipped thermoplastic sheet undergoes a negative thermoforming process, where the tool surface is an ungrained surface (i.e., no decorative graining pattern is formed in the tool surface).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of forming a thermoplastic sheet for use with a vehicle interior panel, the method comprising the steps of:
   providing a thermoplastic sheet having a decorative grain formed in a show surface of the thermoplastic sheet; and
   forming the thermoplastic sheet in a negative thermoforming process by bringing said show surface into direct contact with a surface of a thermoforming tool, wherein the thermoforming tool surface includes a recess or protruding structure that forms a decorative feature other than the decorative grain in the show surface of the thermoplastic sheet;
   wherein the decorative feature is formed in part by the recess or protruding structure as a bend that is more than 90 degrees during the step of forming.

2. The method of claim 1, wherein at least a portion of the show surface is coated before the step of forming.

3. The method of claim 2, wherein the portion of show surface that is coated is raised portions of the grained surface and recessed portions of the grained surface are not coated.

4. The method of claim 1, wherein the show surface includes a radius along the formed feature that is less than 2.0 mm.

5. The method of claim 4, wherein the radius is between 0.8 mm and 2.0 mm.

6. A method of forming a thermoplastic sheet for use with a vehicle interior panel, the method comprising the steps of:
   providing a thermoplastic sheet having a partially coated decorative grain formed in a show surface of the thermoplastic sheet; and
   forming the thermoplastic sheet in a negative thermoforming process by bringing said show surface into direct contact with a surface of a thermoforming tool, wherein the thermoforming tool surface includes a recess or protruding structure that bends the show surface by more than 90 degrees; wherein the recess or protruding structure forms in part a decorative feature from the bend in the show surface of the thermoplastic sheet.

7. The method of claim 6, wherein the decorative feature includes a faux seam line, edge, logo, lettering or any combination thereof.

8. The method of claim 6, wherein the show surface includes a radius that is less than 2.0 mm after the step of forming.

9. The method of claim 8, wherein the radius is between 0.8 mm and 2.0 mm.

* * * * *